US000002042H

(19) United States

(12) Statutory Invention Registration (10) Reg. No.: US H2042 H

Dobrin et al. (43) Published: Aug. 6, 2002

(54) METHOD FOR FORMING A BREATHABLE FILM

(75) Inventors: George C. Dobrin; Thomas M. Goens, both of Cincinnati, OH (US); Donna S. Phillips, Aurora, IN (US); John J. Curro, Cincinnati, OH (US)

(73) Assignee: The Procter & Gamble Company, Cincinnati, OH (US)

(21) Appl. No.: 08/853,301

(22) Filed: May 9, 1997

(51) Int. Cl.[7] ..... D06N 7/04

(52) U.S. Cl. ..... 428/152; 428/156; 428/157; 156/209

(58) Field of Search ..... 156/205, 206, 156/209, 553, 244.11; 264/284, 286; 428/152, 156, 167

(56) References Cited

U.S. PATENT DOCUMENTS

| | | | | |
|---|---|---|---|---|
| 3,156,242 A | | 11/1964 | Crowe, Jr. | 128/156 |
| 3,511,742 A | | 5/1970 | Rasmussen | 161/109 |
| 3,542,634 A | | 11/1970 | Such et al. | 161/88 |
| 3,697,367 A | | 10/1972 | Schwarz | 161/168 |
| 3,839,516 A | | 10/1974 | Williams et al. | 264/41 |
| 3,843,479 A | | 10/1974 | Matsunami et al. | 161/165 |
| 3,881,489 A | | 5/1975 | Hartwell | 128/287 |
| 3,932,682 A | | 1/1976 | Loft et al. | 428/296 |
| 3,989,867 A | | 11/1976 | Sisson | 428/132 |
| 4,056,639 A | | 11/1977 | Schwarz | 426/264 |
| 4,101,625 A | | 7/1978 | Haley | 264/287 |
| 4,116,892 A | | 9/1978 | Schwarz | 521/62 |
| 4,144,008 A | | 3/1979 | Schwarz | 425/66 |
| 4,153,751 A | | 5/1979 | Schwarz | 428/304 |
| 4,223,059 A | | 9/1980 | Schwarz | 428/198 |
| 4,223,063 A | | 9/1980 | Sabee | 428/224 |
| 4,285,100 A | | 8/1981 | Schwarz | 19/161.1 |
| 4,289,832 A | | 9/1981 | Schwarz | 428/542 |
| 4,341,216 A | | 7/1982 | Obenour | 128/287 |
| 4,350,655 A | | 9/1982 | Hoge | 264/145 |
| 4,368,565 A | | 1/1983 | Schwarz | 26/99 |
| 4,438,167 A | | 3/1984 | Schwarz | 428/138 |
| 4,648,876 A | | 3/1987 | Becker et al. | 604/370 |
| 4,695,484 A | | 9/1987 | Tanaka et al. | 427/245 |
| 4,815,714 A | | 3/1989 | Douglas | 264/22 |
| 4,878,974 A | | 11/1989 | Kagawa | 156/85 |
| 4,929,303 A | * | 5/1990 | Sheth | 156/209 |
| 4,940,462 A | | 7/1990 | Salerno | 604/387 |
| 5,125,918 A | | 6/1992 | Seidy | 604/386 |
| 5,143,774 A | | 9/1992 | Cancio et al. | 428/169 |
| 5,209,801 A | | 5/1993 | Smith | 156/161 |
| 5,234,422 A | | 8/1993 | Sneller et al. | 604/385.2 |
| 5,344,691 A | | 9/1994 | Hanschen et al. | 428/152 |
| 5,422,178 A | | 6/1995 | Swenson et al. | 428/343 |
| 5,518,801 A | | 5/1996 | Chappell et al. | 428/152 |
| 5,723,087 A | * | 3/1998 | Chappell et al. | 264/284 |

FOREIGN PATENT DOCUMENTS

| | | | |
|---|---|---|---|
| EP | 0 511 905 A1 | 11/1992 | A61F/13/15 |
| EP | 0 467 184 B1 | 10/1995 | A61F/13/56 |

* cited by examiner

*Primary Examiner*—Peter A. Nelson

(74) *Attorney, Agent, or Firm*—Kevin C. Johnson; Steven W. Miller; Jacobus C. Rasser

(57) ABSTRACT

A method for forming a breathable film material. A film which is a blend of a thermoplastic polymer and an inorganic filler is fed between a first roll and a second roll. The first roll has a plurality of toothed regions spaced apart by a plurality of grooved regions. The toothed regions include a plurality of teeth. The second roll has a plurality of teeth which mesh with the teeth on the first roll. As the film is fed between the first roll and the second roll the portion of the film passing between the grooved regions on the first roll and the teeth on the second roll remains substantially planar forming first regions in the film while the portion of the film passing between the teeth on the first roll and the teeth on the second roll are formed into second regions having raised rib-like elements.

1 Claim, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR FORMING A BREATHABLE FILM

FIELD OF THE INVENTION

The present invention relates to a method for forming a breathable film, and more particularly, to a method for forming a breathable film comprising a blend of a thermoplastic polymer with an inorganic material. The breathable film is particularly useful as a backsheet on a disposable absorbent article.

BACKGROUND OF THE INVENTION

Infants and other incontinent individuals wear disposable absorbent articles such as diapers to receive and contain urine and other body exudates. Absorbent articles function both to contain the discharged materials and to isolate these materials from the body of the wearer and from the wearer's garments and bed clothing. Disposable absorbent articles having many different basic designs are known to the art. It is also known that the exterior of disposable diapers can be covered with a flexible, liquid and vapor impervious sheet to prevent any absorbed liquid from passing through the diaper and soiling adjacent articles such as clothing, bedding and the like. These outer covers, generally referred to as backsheets, are often constructed from fluid impervious films such as polyethylene. Although such backsheets do prevent liquid from passing through the diaper, they also can make the diaper feel hot and uncomfortable to wear because of their impermeability to air and/or moisture.

Backsheets which are pervious to vapor are generally known as breathable backsheets and have been described in the art. In general, these backsheets are intended to allow the passage of vapor through them while retarding the passage of liquid. For example, U.S. Pat. No. 3,156,242 issued to Crowe, Jr. on Nov. 10, 1964 teaches the use of a microporous film as a breathable backsheet. U.S. Pat. No. 3,881,489 issued to Hartwell on May 6, 1975 teaches a breathable backsheet comprising in combination two layers, the first of which is a low void volume perforated thermoplastic film and the, second of which is a porous high void volume hydrophobic tissue. U.S. Pat. No. 3,989,867 issued to Sisson on Nov. 2, 1976 teaches a breathable backsheet provided with tapered hollow bosses which prevent the passage of liquids while allowing vapors to readily pass.

Of the breathable backsheets, microporous films are most commonly used. Microporous films typically comprise a blend of a thermoplastic polymer and an inorganic filler such as calcium carbonate. The blend undergoes pore formation upon stretching as the inorganic filler separates from the polymer due to stress concentration. The formation of micropores permits the film to be breathable allowing the passage of vapor through the micropores while retarding the passage of liquid.

It is an object of the present invention to provide a novel process for forming a breathable film from a blend of a thermoplastic polymer with an inorganic material.

SUMMARY OF THE INVENTION

In accordance with the present invention, there is provided a method for forming a breathable film. The film is comprised of a blend of a thermoplastic. polymer with an inorganic material being selected from the group consisting of calcium carbonate, clay and titanium dioxide, with the preferred inorganic filler being calcium carbonate. The blended film is fed between a pair of opposing first and second rolls. The first roll comprises a plurality of toothed regions spaced apart by a plurality of grooved regions wherein the toothed regions comprises a plurality of teeth. The second roll comprises a plurality of teeth which mesh with the teeth on the first roll. As the film is fed between the first and said second rolls the portion of the film passing between the grooved regions on the first roll and the teeth on the second roll remains substantially planar forming a first region in the film while the portion of the film passing between the teeth on the first roll and the teeth on the second roll is formed into second regions having raised rib-like elements.

BRIEF DESCRIPTION OF THE DRAWINGS

While the specification concludes with claims particularly pointing out and distinctly claiming the present invention, it is believed that the present invention will be better understood from the following description in conjunction with the accompanying drawings, in which like reference numerals identify like elements and wherein:

DETAILED DESCRIPTION OF THE INVENTION

While the present invention will be described in the context of a method for producing a breathable film which is particularly well suited for use as a backsheet on a disposable absorbent article such as a disposable diaper, sanitary napkin, or bandage the present invention is in no way limited to such application. The detailed description of the method herein will allow one skilled in the art to readily adapt the present invention to other applications.

Figure 1:
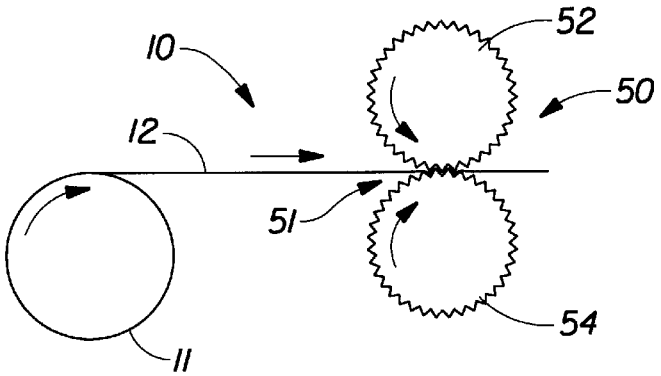
FIG. 1 is a schematic illustration of an exemplary process for forming the breathable film of the present invention.

Referring to FIG. 1 there is schematically illustrated at 10 a process for forming a breathable material of the present invention. According to the present invention, a film 12 is unwound from supply roll 11 and travels in the direction indicated by the arrows associated therewith as the supply roll 11 rotates in the direction indicated by the arrows associated therewith. The film 12 comprises a blend of a thermoplastic polymer with an inorganic material. Suitable thermoplastic polymers include polyolefins such as polyethylenes, including linear low density polyethylene (LLDPE), low density polyethylene (LDPE), ultra low density polyethylene (ULDPE), high density polyethylene (HDPE), or polypropylene and blends thereof with the above and other materials. Examples of other suitable thermoplastic polymers which may also be used include, but are not limited to, polyester, polyurethanes, compostable or biodegradable polymers, heat shrink polymers, thermoplastic elastomers, and metallocene catalyst-based polymers (e.g., INSITE® available from Dow Chemical Company and Exxact® available from Exxon).

The inorganic material or filler is selected from the group consisting of calcium carbonate, clay and titanium dioxide, with the preferred inorganic filler being calcium carbonate. Inorganic fillers having a particle size of from about 1 to about 5 microns and constitute of from about 5 to about 70 percent by weight of the blend, preferably from about 20 to about 60 percent by weight of the blend. The inorganic filler may be coated with a fatty acid ester to obtain higher loadings in the polymer.

The inorganic filler and the thermoplastic polymer are blended together to form a homogeneous mixture in a suitable mixing extruder, or in a separate preliminary compounding step. The mixture is then cast or blown into a film.

Figure 2:
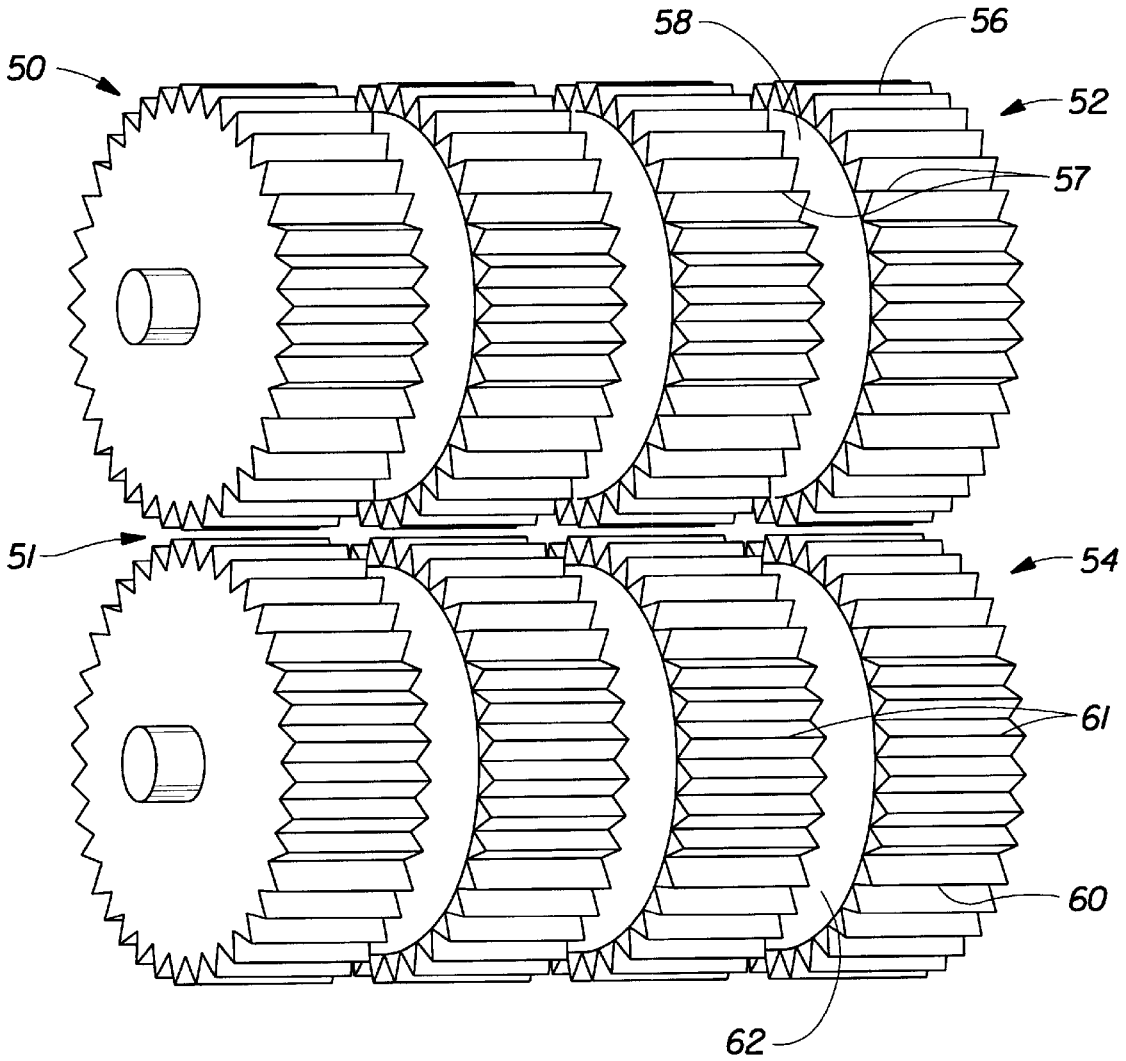
FIG. 2 is an enlarged illustration of the opposing pairs of rolls of the process of FIG. 1.

From the supply roll 11 the film 12 is fed through a nip 51 of a pair of opposing rolls 52 and 54 of apparatus 50. The apparatus 50 is more clearly shown in FIG. 2. Roll 52 comprises a plurality of toothed regions 56 and grooved regions 58 extending about the circumference of the roll. The toothed regions 56 include a plurality of teeth 57. Teeth 57 are substantially parallel to the axis of roll 52. Roll 54 comprises a plurality of toothed regions 60 and grooved regions 62 extending about the circumference of the roll. The toothed regions 60 include a plurality of teeth 61. Teeth 61 are substantially parallel to the axis of roll 54. The grooved regions 58 of roll 52 are aligned with the grooved regions 62 of roll 54. Similarly, the toothed regions 56 of roll 52 are aligned with the toothed regions 60 of roll 54 permitting teeth 57 of roll 52 to engage or intermesh with teeth 61 of roll 54. The portions of the film 12 passing between the grooved regions 58 and 62 will be unformed, i.e., the film 12 will not be formed or stretched and will remain substantially planar, while the portions of the film passing between toothed regions 56 and 60 will be formed and/or stretched producing rib-like elements in the film.

Conventional drive means and other conventional devices which may be utilized in conjunction with the apparatus of FIG. 1 are well known and, for purposes of clarity, have not been illustrated in the schematic view of Fig. 1.

The above sequence may be repeated any number of times until the desired properties are obtained. Furthermore, the degree of engagement of opposing rolls, the dimension, shape and spacing of the teeth on the opposing rolls, and the size of the rolls can be chosen to produce the desired properties.

Figure 3:
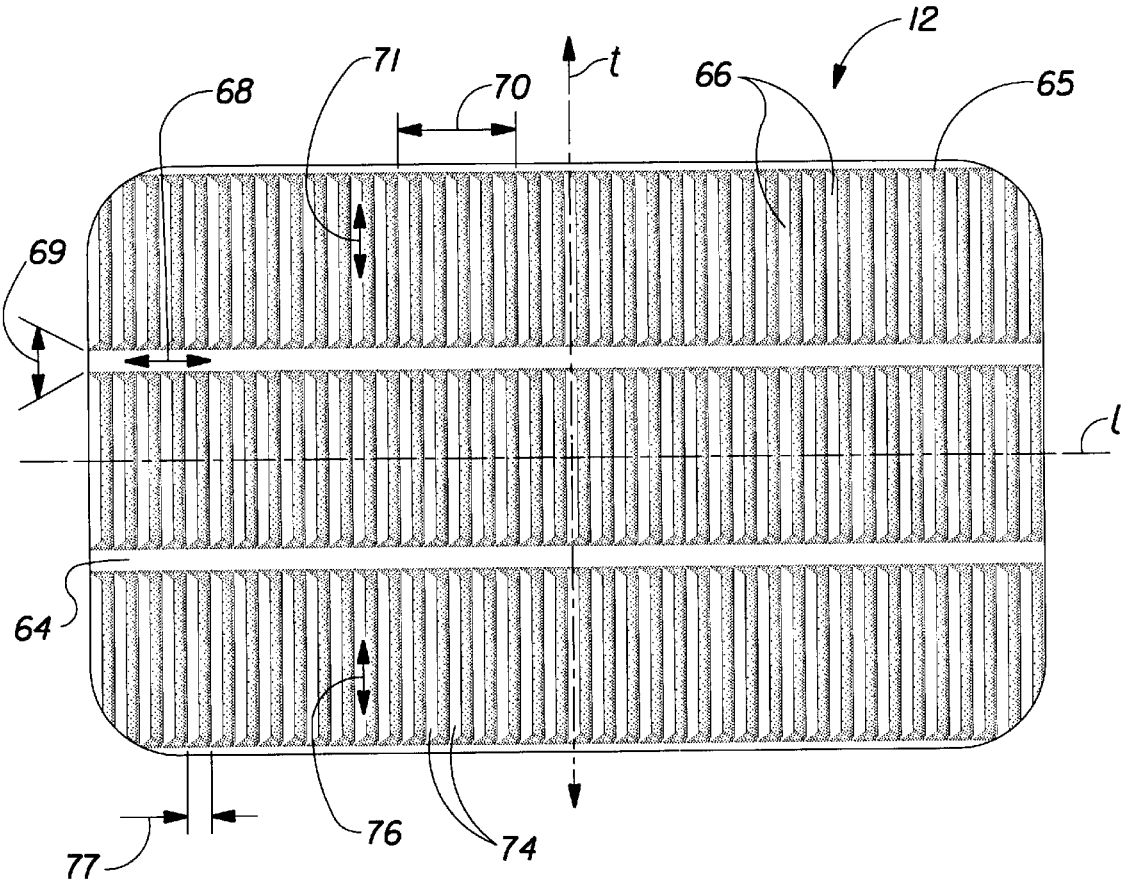
FIG. 3 is a plan view illustration of a preferred embodiment of a breathable polymeric film having a first region and a second region of the present invention with the rib-like elements of the second region facing toward the viewer.

Referring now to FIG. 3 there is illustrated a preferred embodiment of a breathable film 12 after having passed through the pair of opposing rolls 52 and 54 of apparatus 50. The breathable film 12 is shown in FIG. 3 in its substantially untensioned condition. The breathable film 12 is particularly well suited for use as a backsheet on an absorbent article, such as a sanitary napkin or a disposable diaper. The film 12 has two centerlines, a longitudinal centerline, which is also referred to hereinafter as an axis, line, or direction "1" and a transverse or lateral centerline, which is also referred to hereinafter as an axis, line, or direction "t". The transverse centerline "t" is generally perpendicular to the longitudinal centerline "1".

Figure 3A:
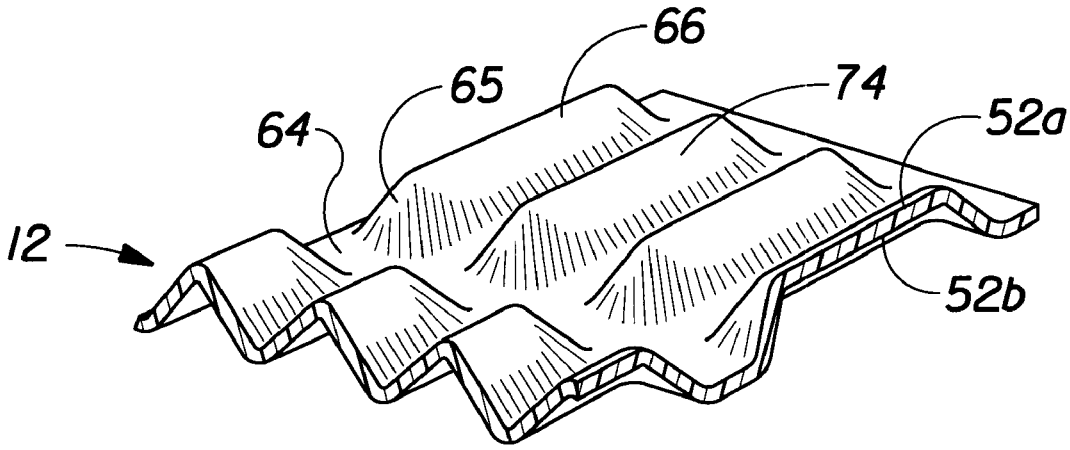
FIG. 3A is a segmented, perspective illustration of the breathable film of FIG. 3 in an untensioned condition.

Referring now to FIGS. 3 and 3A, film 12 includes a network of distinct regions. The network includes at least a first region 64 and a second region 66. Film 12 includes a transitional region 65 which is at the interface between the first region 64 and the second region 66. Film 12 has a first surface 52*a* and an opposing second surface 52*b*. In the embodiment shown in FIGS. 3 and 3A, the film includes a plurality of first regions 64 and a plurality of second regions 66. The first regions 64 have a first axis 68 and a second axis 69, wherein the first axis 68 is preferably longer than the second axis 69. The first axis 68 of the first region 64 is substantially parallel to the longitudinal axis of the film 12 while the second axis 69 is substantially parallel to the transverse axis of the film 12. The second regions 66 have a first axis 70 and a second axis 71. The first axis 70 is substantially parallel to the longitudinal axis of the film 12, while the second axis 71 is substantially parallel to the transverse axis of the film 12. In the preferred embodiment of FIG. 3, the first regions 64 and the second regions 66 are substantially linear, extending continuously in a direction substantially parallel to the longitudinal axis of the film 12.

The film 12 is comprised of at least a first region and a second region, wherein the first region is visually distinct from the second region. As used herein, the term "visually distinct" refers to features of the film which are readily discernible to the normal naked eye when the film or objects embodying the film are subjected to normal use.

In the preferred embodiment shown in FIGS. 3 and 3A, the first regions 64 are substantially planar. That is, the material within the first region 64 is in substantially the same condition before and after the formation step undergone by film 12. The second regions 66 include a plurality of raised rib-like elements 74. The rib-like elements 74 have a first or major axis 76 which is substantially parallel to the transverse axis of the film 12 and a second or minor axis 77 which is substantially parallel to the longitudinal axis of the film 12. The first axis 76 of the rib-like elements 74 is at least equal to, and preferably longer than the second axis 77. Preferably, the ratio of the first axis 76 to the second axis 77 is at least about 1:1 or greater, and more preferably at least about 2:1 or greater.

The rib-like elements 74 in the second region 66 may be separated from one another by unformed areas. Preferably, the rib-like elements 74 are adjacent one another and are separated by an unformed area of less than 0.10 inches as measured perpendicular to the major axis 76 of the rib-like elements 74, and more preferably, the rib-like elements 74 are contiguous having no unformed areas between them. The dimension of the rib-like elements can also be varied. A more detailed description of a film having first and second regions as shown in FIGS. 3 and 3A can be found in U.S. Pat. No. 5,518,801 issued to Chappell et. al. on May, 21, 1996which is incorporated herein by reference.

Figure 4:
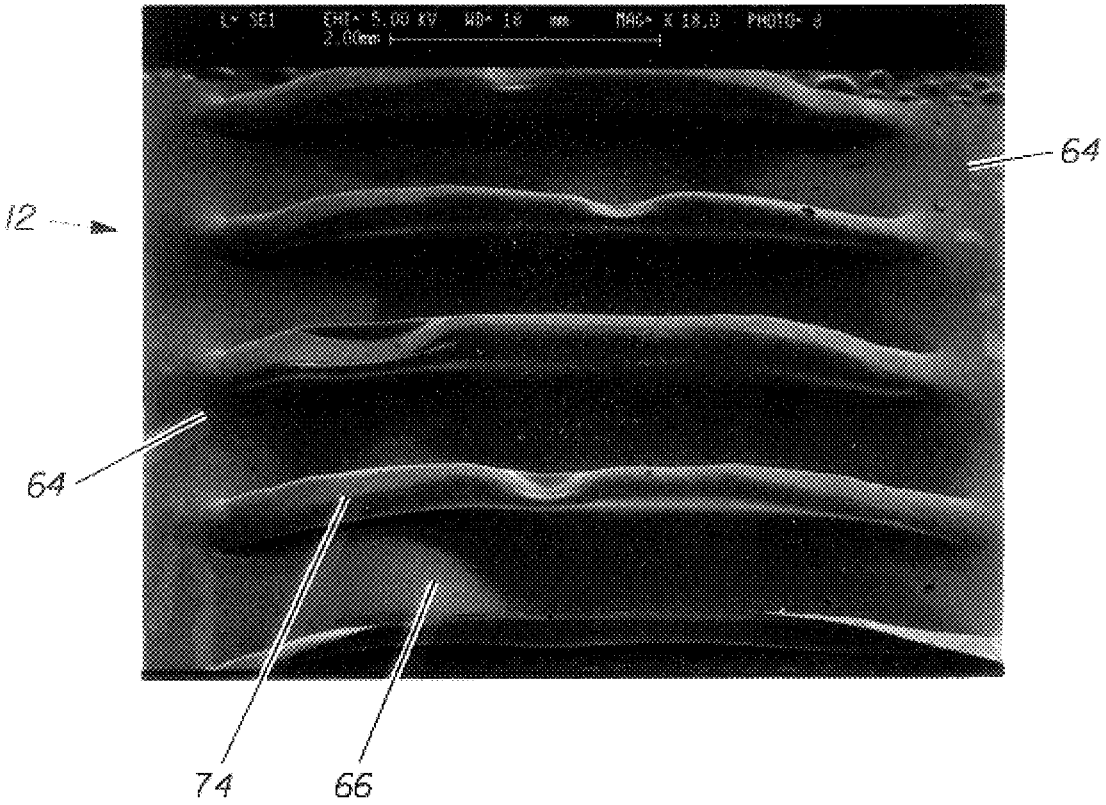
FIG. 4 is an enlarged photograph of the breathable film of the present invention.

Referring now to FIG. 4 there is shown an enlarged photograph of the film 12 after having passed through a pair of opposing rolls of the present invention, like opposing rolls 52 and 54 of apparatus 50. As can be seen in FIG. 4, the film 12 includes substantially planar first regions 64 and second regions 66 which include raised rib-like elements 74. The portions of the film 12 forming the rib-like elements 74 of the second region 66 have been stretched or thinned as opposed to the thicker first regions 64 which have not been stretched or thinned. While the second regions 66 have been stretched or thinned, the stretching or thinning is not necessarily uniform throughout the second regions 66.

Figure 4A:
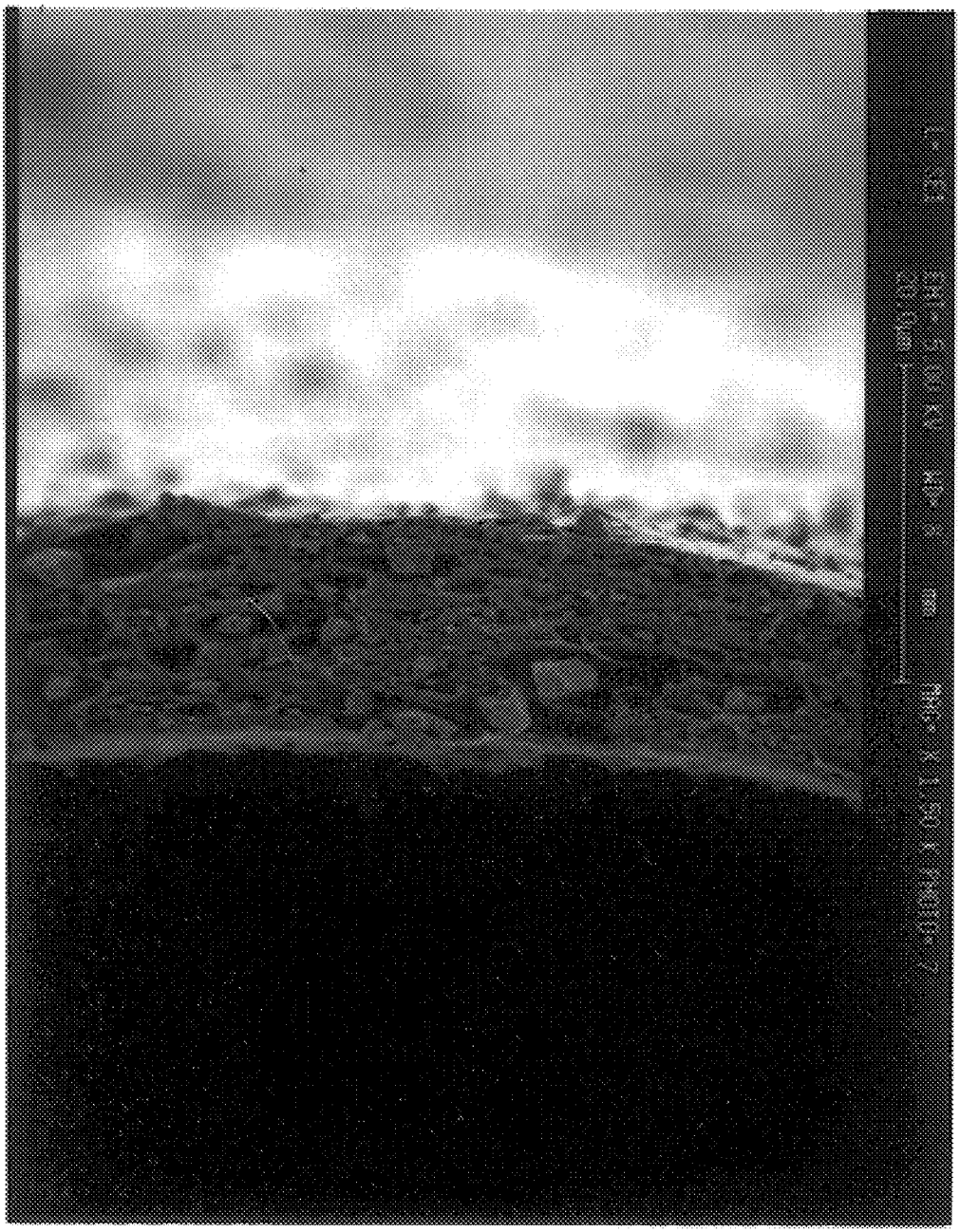
FIGS. 4A and 4B are enlarged photographs of the breathable films cross-section illustrating the formation of micropores in the portions of the film which have been stretched or thinned.
Figure 4B:
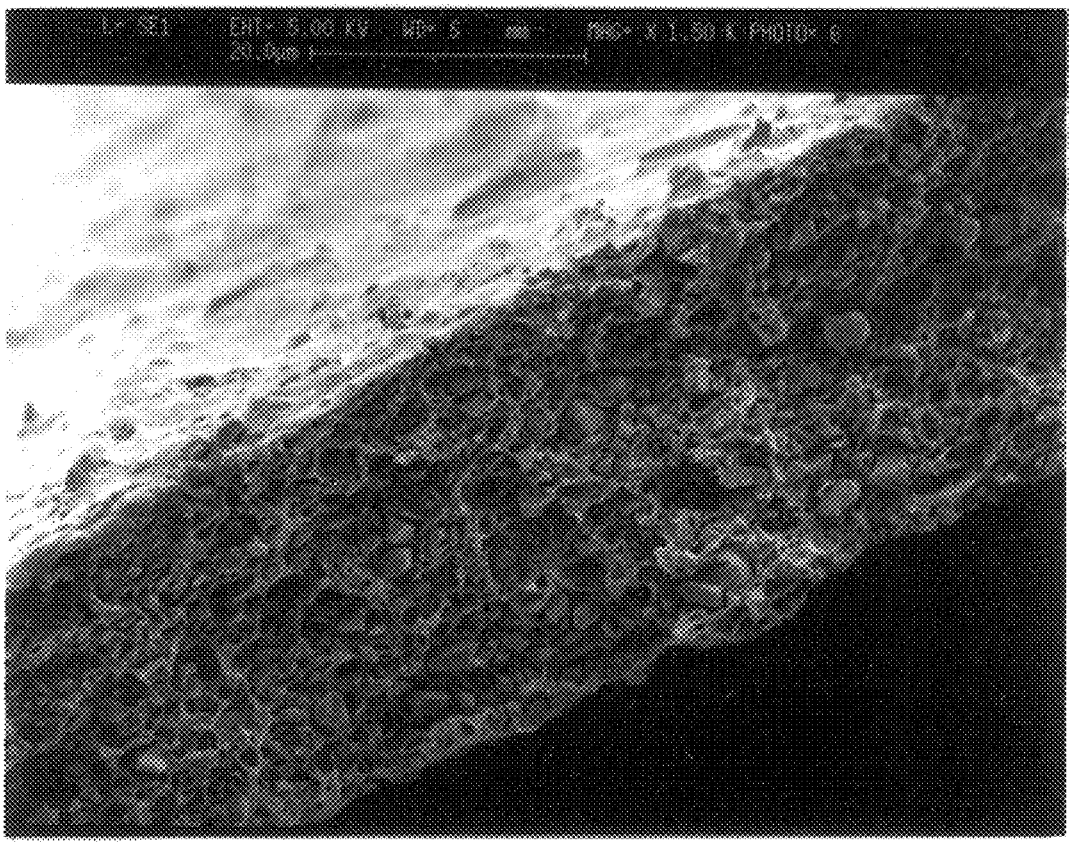

FIGS. 4A and 4B are enlarged photographs of portions of the films in cross-section. The portion of the film in FIG. 4A has been stretched to a greater degree than the portion of the film in FIG. 4B and as a result has a thickness dimension less than that of the portion of the film in FIG. 4B. In addition to having a reduced thickness, the film shown in FIG. 4A has an increased pore volume compared to the film shown in FIG. 4B. The stretching of the film separates the inorganic filler from the polymer due to stress concentration creating pores in the film. The formation of micropores permits the film to be breathable allowing the passage of vapor therethrough while retarding the passage of liquid.

One measurement of breathability is the moisture vapor transmission rate (MVTR) of the material. In order to reduce humidity and he at buildup within the diaper, it has been found that the breathable film of the present invention when used as a backsheet on a disposable diaper should have a moisture vapor transmission rate of from about 500 $g/m^2/24$ hr. to about 5000 $g/m^2/24$ hr., more preferably from about 1000 $g/m^2/24$ hr. to about 5000 $g/m^2/24$ hr., and most preferably from about 2000 $g/m^2/24$ hr. to about 5000 $g/m^2/24$ hr.

The moisture vapor transmission rate is measured by the method set forth below. A known amount of $CaCl_2$ is put into a flanged cup. A sample material is placed on top of the cup and held securely by a retaining ring and gasket. The assembly is then weighed and recorded as the initial weight. The assembly is placed in a constant temperature (40° C.) and humidity (75% RH) chamber for five (5) hours. The assembly is then removed from the chamber and allowed to equilibrate for at least 30 minutes at the temperature of the room where the balance is located. The assembly is then weighed and recorded as the final weight. The moisture vapor transmission rate is calculated and expressed in $g/m^2/24$ hr. using the following formula:

$$\text{MVTR} = \frac{(\text{final weight} - \text{initial weight}) \times 24.0}{\text{area of sample in meters} \times 5.0 \text{ (time in chamber)}}$$

Another measurement of breathability is the oxygen permeation rate (OPR) of the material. In order to reduce humidity and heat buildup within the diaper, it has been found that the breathable film of the present invention when used as a backsheet on a disposable diaper should have a oxygen permeation rate of from about 3 cu. meters/sq. meter/24 hrs. to about 20 cu. meters/sq. meter/24 hrs.

The oxygen permeation rate is measured by the method set forth below. The rate of oxygen permeation through a material is measured using a glass chamber with an oxygen monitor and probe. A sample is cut approximately equal in diameter to an aluminum foil disc having a 12 cm diameter, Mocon Part #025–493. The sample is placed on top of the disc. The glass chamber is placed on the disc and a circle is traced. The circle in the sample is cut. Once prepared, the sample disc (foil side down) is clamped between the glass chamber containing the probe and the center glass piece. A circular piece of rubber is placed between the center glass piece and the open ended glass chamber and sealed with a second clamp. The chamber is flushed with nitrogen to a concentration of 0.1% oxygen on both sides of the film. One side is then exposed to air (20.9% oxygen), and the times required to reach predetermined oxygen concentrations on the opposite side of the film are recorded. The permeation rate of oxygen through the sample is then calculated using the following formula:

$$\text{OPR} = \frac{(5.57 * 10^4)(\text{volume (mL)})}{(\text{average time (sec)})}$$

Where:

$(5.57*10^4)$=Constant value incorporating the slope (time in minutes vs % oxygen level change (0.5%)), 1% oxygen level of interest, conversion of seconds to minutes, conversion of minutes to days and surface area of sample (0.775 $in^2$);

Volume=Measured volume of the glass chamber containing the oxygen probe;

Average time=Average value of the time interval associated with a 0.5% increase in oxygen concentration.

Prior to undergoing the process of the present invention the blended film has a moisture vapor transmission rate of less than about 100 $g/m^2/24$ hr. and an oxygen permeation rate of less than about 0.5 cu. meters/sq. meter/24 hrs. Thus blended film does not provide the desired breathability achieved by the film after having undergone the process of the present invention.

As seen in FIGS. 3A and 4, the method of the present invention expands the film out of the x-y plane, i.e., in the z direction to provide the film with an increased caliper via the raised rib-like elements. In contrast, traditional incremental stretching equipment, such as disclosed in U.S. Pat. No. 4,116,892 issued to Schwarz on Sep. 26, 1978, expands the film in the x-y plane, in either the longitudinal or transverse directions or both. Thus, traditional incremental stretching equipment produces a film of larger planar dimension, e.g., a film having a larger width and/or length dimension. Producing a film of larger dimension may be undesirable in certain circumstances as this may require modifying existing production equipment to handle the larger film.

In addition to providing the film with breathability, the process of the present invention provides a film having a cloth-like appearance. This is particularly important if the film is to be used as a backsheet on a disposable diaper. Furthermore, the present invention may also provide the breathable film with elastic-like properties allowing the film to stretch under relatively low forces. The ability to stretch under normal wearing forces can be very beneficial for disposable diapers to provide increased comfort and improved fit for the wearer.

As opposed to being unwound from a supply roll as shown in FIG. 1, the film 12 may be fed through the nip 51 of opposing rolls 52 and 54 without first being stored on a supply roll. For example, the film 12 may be fed through the nip 51 directly from an extruder.

After the film 12 has been fed through the nip 51 of opposing rolls 52 and 54 the film 12 may be wound up onto a take-up roll. Alternatively, the film may be fed directly to a disposable absorbent article converter where it forms the backsheet of a disposable absorbent article.

Examples of disposable absorbent articles are described in U.S. Pat. No. 4,950,264, issued to Osborn on Aug. 21, 1990; U.S. Pat. No. 4,425,130, issued to DesMarais on Jan. 10, 1984; U.S. Pat. No. 4,321,924, issued to Ahr on Mar. 30, 1982; U.S. Pat. No. 4,589,876, issued to Van Tilburg on Aug. 18, 1987; U.S. Pat. No. 3,860,003, issued to Kenneth B. Buell on Jan. 14, 1975; and U.S. Pat. No. 5,151,092 issued to Kenneth B. Buell et al. on Sept. 29, 1992. Each of these patents are hereby incorporated herein by reference.

While the entire portion of the film may be subjected to the forming operation, the present invention may also be practiced by subjecting to formation only a portion thereof For example, it may be desirable to provide specific portions of the diaper backsheet with breathability, such as the side portions while leaving other portions, such as the central portion of the backsheet nonbreathable.

After being formed as described above, the breathable film of the present invention may be secured to other materials to form a laminate. Preferably, the breathable film of the present invention is secured to a nonwoven web. The nonwoven web may comprise natural fibers (e.g., cotton or wood fibers), or may comprise synthetic fibers such as polyethylene, polypropylene, polyester, or any combination of such fibers. The nonwoven web may be carded, spunmelt, meltblown, or air-through bonded, or have any other characteristic or be manufactured in any manner known in the art. Nonwoven webs are preferred when the laminate is to be used as a diaper backsheet as the nonwoven web forms the outermost cover of the diaper providing the diaper with a cloth-like look and feel. Further, the outer nonwoven web cover may provide the diaper with a landing zone capable of engaging the hooks of a hook and loop type fastener. Other embodiments are contemplated wherein the breathable film is secured to other materials such as woven webs, foams, scrims, films, loose fibers, or any other material or combination that will give the diaper a cloth-like look and feel.

The laminates may be made by any number of methods known to those skilled in the art. Such bonding methods include but are not limited to heat bonds, adhesive bonds (using any of a number of adhesives including but not limited to spray adhesives, hot melt adhesives, latex based adhesives and the. like), pressure bonds, ultrasonic bonds, dynamic mechanical bonds, sonic bonds, or any other suitable attachment technique or combinations of these attachment techniques as are known in the art.

Alternatively, the blended film may first be secured to another material to form a laminate prior to being formed according to the method of the present invention as described above. The laminate may comprise any of the aforementioned structures. In an especially preferred embodiment, the laminate is formed by extruding the breathable blend onto a nonwoven web. The blended film is extruded directly onto a nonwoven web while still in a partially molten state, thereby bonding the blended film to one side of the nonwoven web. The laminate may then be subjected to the process of the present invention. Alternatively, the laminate may be formed by vacuum laminating a nonwoven web to the breathable blend. The laminate may then be subjected to the process of the present invention.

Figure 5:
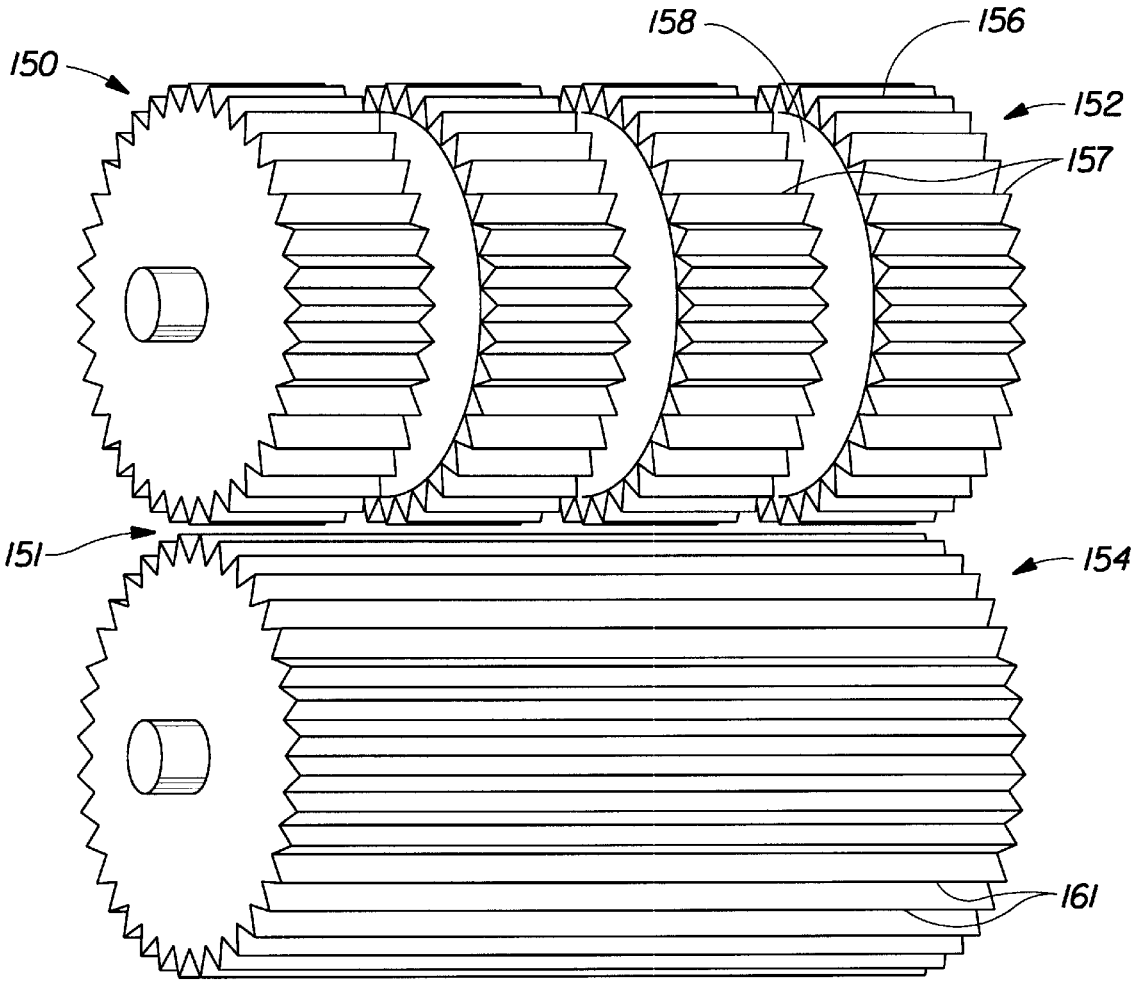
FIG. 5 is an illustration of an alternative embodiment of the opposing pairs of rolls of the process of FIG. 1.

Referring now to FIG. 5 there is shown an illustration of an alternative embodiment of the opposing pairs of rolls of the process of FIG. 1. From the supply roll 11 the film 12 is fed through a nip 151 of a pair of opposing rolls 152 and 154 of apparatus 150. Roll 152 comprises a plurality of toothed regions 156 and grooved regions 158 extending about the circumference of the roll. The toothed regions 156 include a plurality of teeth 157. Teeth 157 are substantially parallel to the axis of roll 152. Roll 154 comprises a plurality of teeth 161 extending about the circumference of the roll. Teeth 161 are substantially parallel to the axis of roll 154. Teeth 157 of roll 152 engage or intermesh with teeth 161 of roll 154. The portions of the film 12 passing between the grooved regions 58 of roll 152 and the teeth 161 of roll 154 will be unformed, i.e., the film 12 will not be formed or stretched and will remain substantially planar, while the portions of the film passing between toothed regions 156 comprising teeth 157 and the teeth 161 of roll 154 will be formed and/or stretched producing rib-like elements in the film.

Figure 6:
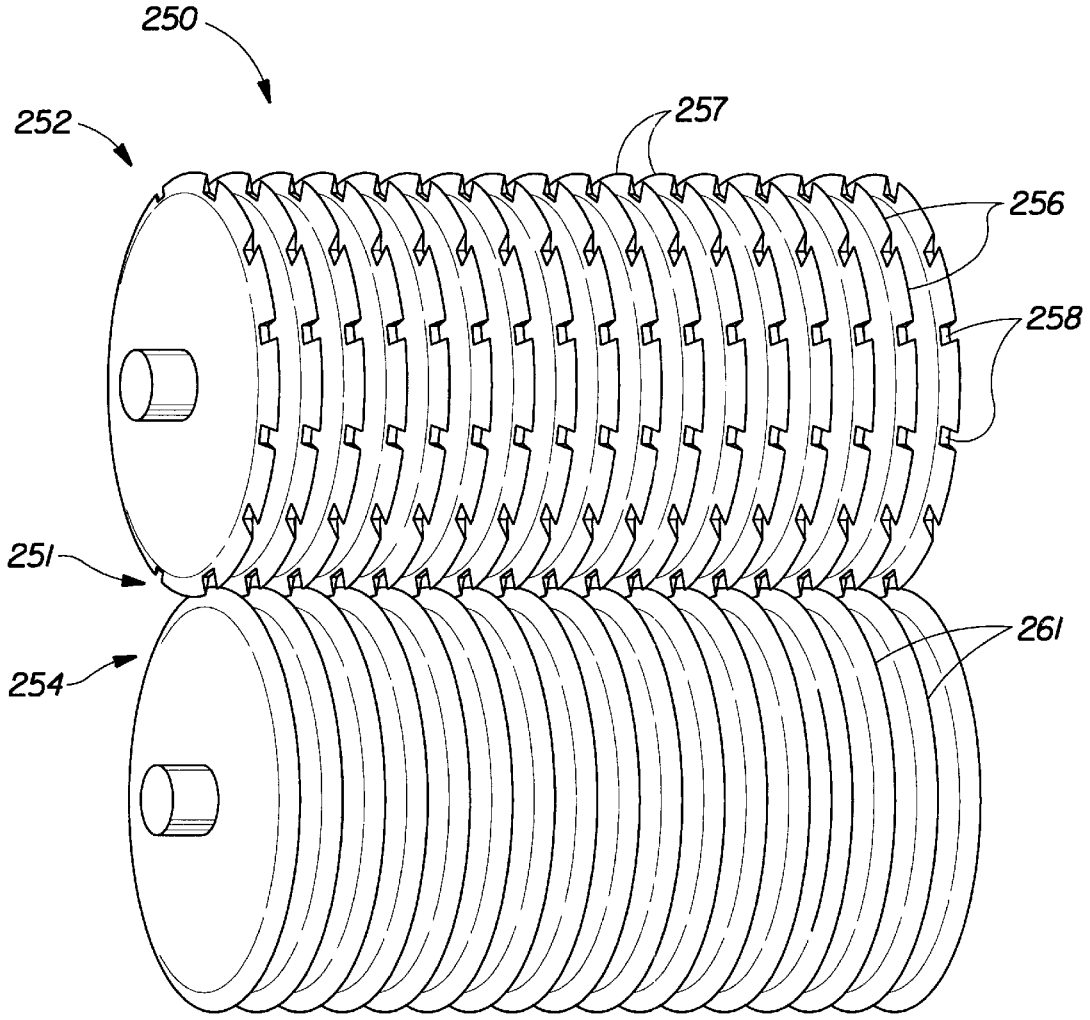
FIG. 6 is an illustration of another embodiment of the opposing pairs of rolls of the process of FIG. 1.
Figure 7:
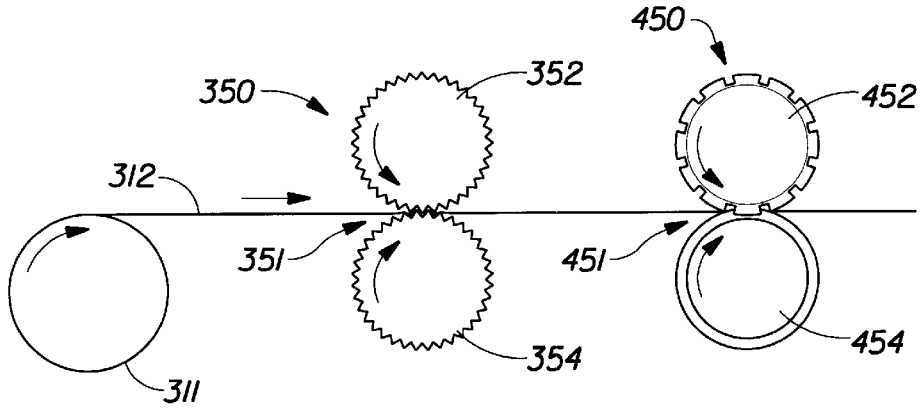
FIG. 7 is a schematic illustration of an alternative process for forming the breathable film of the present invention.

Referring now to FIG. 6 there is shown an illustration of an alternative embodiment of the opposing pairs of rolls of the process of FIG. 1. From the supply roll 11 the film 12 is fed through a nip 251 of a pair of opposing rolls 252 and 254 of apparatus 250. Roll 252 comprises a plurality of toothed regions 256 and grooved regions 258 that extend parallel to the axis of roll 252. The toothed regions 256 include a plurality of teeth 257. Teeth 257 are substantially perpendicular to the axis of roll 252. Roll 254 comprises a plurality of teeth 261 extending about the circumference of the roll. Teeth 261 are substantially perpendicular to the axis of roll 254. Teeth 257 of roll 252 engage or intermesh with teeth 261 of roll 254. The portions of the film 12 passing between the grooved regions 258 of roll 252 and the teeth 261 of roll 254 will be unformed, i.e., the film 12 will not be formed or stretched and will remain substantially planar, while the portions of the film passing between toothed regions 256 comprising teeth 257 and the teeth 261 of roll 254 will be formed and/or stretched producing rib-like elements in the film. FIG. 7 is a schematic illustration of an alternative process for forming the breathable film of the present invention. According to the present invention, a film 312 is unwound from supply roll 311 and travels in the direction indicated by the arrows associated therewith as the supply roll 311 rotates in the direction indicated by the arrows associated therewith. The film 312 comprises a blend of a thermoplastic polymer with an inorganic material. From the supply roll 311 the film 312 is fed through a nip 351 of a pair of opposing rolls 352 and 354 of apparatus 350. The opposing rolls 352 and 354 may be any one of those shown in any one of FIGS. 2, 5 or 6. After having been formed by apparatus 350 the film 312 is fed through a nip of a pair of opposing rolls 452 and 454 of apparatus 450. The opposing rolls 452 and 454 may be any one of those shown in any one of FIGS. 2, 5 or 6.

The above sequence may be repeated any number of times until the desired properties are obtained. Furthermore, the degree of engagement of opposing rolls, the dimension, shape and spacing of the teeth on the opposing rolls, and the size of the rolls can be chosen to produce the desired properties.

In an alternative embodiment, the process of the present invention may be practiced in combination with the incremental stretching operation disclosed in the aforementioned U.S. Pat. No. 4,116,892 issued to Schwarz on Sep. 26, 1978, which is incorporated herein by reference. For example, the film may be incrementally stretched as disclosed in Schwarz and then fed through the opposing rolls of the present invention. The above sequence may be reversed and/or repeated to produce the desired properties in the film.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A backsheet for a disposable absorbent article wherein micropores are formed in said backsheet to render said backsheet breathable.

* * * * *